(12) United States Patent
Hey

(10) Patent No.: US 9,116,044 B2
(45) Date of Patent: Aug. 25, 2015

(54) SYSTEM AND METHOD FOR DETERMINING SIZE AND LOCATION OF MINIMUM BEAM SPOT

(71) Applicant: KLA-Tencor Corporation, Milpitas, CA (US)

(72) Inventor: Daniel Hey, San Jose, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 214 days.

(21) Appl. No.: 13/646,246

(22) Filed: Oct. 5, 2012

(65) Prior Publication Data

US 2014/0098363 A1    Apr. 10, 2014

(51) Int. Cl.
*G01J 1/00* (2006.01)
*G01J 1/42* (2006.01)
*G01J 1/04* (2006.01)

(52) U.S. Cl.
CPC ............. *G01J 1/4257* (2013.01); *G01J 1/0437* (2013.01); *G01J 1/0444* (2013.01)

(58) Field of Classification Search
CPC ...... G01J 1/4257; G01J 1/0437; G01J 1/0444
USPC .................. 356/121–123, 224, 245, 229.233
See application file for complete search history.

(56) References Cited

U.S. PATENT DOCUMENTS

| 5,450,207 A | 9/1995 | Fomenkov |
| 6,081,325 A | 6/2000 | Leslie et al. |
| 6,313,910 B1 * | 11/2001 | Garvey et al. ................ 356/121 |
| 6,466,304 B1 | 10/2002 | Smith |
| 8,130,374 B2 | 3/2012 | Karassiouk |
| 2005/0253046 A1 * | 11/2005 | Bulpitt ......................... 250/216 |

FOREIGN PATENT DOCUMENTS

JP    2009-156573 A    7/2009

* cited by examiner

*Primary Examiner* — Tarifur Chowdhury
*Assistant Examiner* — Sunghee Y Gray
(74) *Attorney, Agent, or Firm* — Suiter Swantz pc llo

(57) ABSTRACT

The disclosure is directed to a system and method for determining at least one characteristic of an illumination beam emanating from an illumination source. A substrate having a plurality of apertures may be actuated through an illumination beam so that apertures at different spatial offsets are scanned through the illumination beam at one or more levels of focus. Portions of illumination directed through scanned apertures may be received by at least one detector. At least one characteristic of the illumination beam may be extracted from data points associated with intensity levels associated with detected portions of illumination. Furthermore, multiple determinations of a beam characteristic made over a period of time may be utilized to calibrate the illumination source.

22 Claims, 7 Drawing Sheets

SYSTEM AND METHOD FOR DETERMINING SIZE AND LOCATION OF MINIMUM BEAM SPOT

TECHNICAL FIELD

The present disclosure generally relates to the field of illumination beams and more particularly to a system and method for determining at least one characteristic related to a minimum beam spot of an illumination beam.

BACKGROUND

Many modern metrology systems rely on optical analysis of interactions between illumination emanating from at least one illumination source and the surface of a sample being analyzed. Characteristics of an illumination beam provided by an illumination source may change over time as a result of deterioration or movement of illumination source components. Accordingly, the illumination source may need to be recalibrated from time to time to compensate for changes of illumination beam characteristics, such as minimum beam spot size and/or location, beam caustic, and the like.

Current methods for measuring illumination beam characteristics are time consuming and often impractical for on-site calibration of an illumination source. For example, one current method of measuring illumination beam characteristics entails illumination scattering from particles deposited on a wafer to analyze defects with properly aligned scattering collection optics. As such, it would be advantageous to provide a method for illumination beam characterization that cure the defects of the prior.

SUMMARY

One embodiment of the present disclosure is directed to a system for determining at least one characteristic of an illumination beam emanating from an illumination source including a substrate configured to receive illumination from an illumination source. The substrate may include a plurality of apertures being spatially distributed along a selected scanning path. The illumination source may be configured to illuminate a selected number of apertures over a selected time interval. The plurality of apertures may further be spatially offset from one another in a direction substantially perpendicular to the scanning path. An actuator may be configured to actuate the substrate to move the plurality of apertures through an illumination beam emanating from the illumination source. The distribution of the plurality of apertures may allow a first portion of illumination having a first intensity level to pass through a first aperture and at least one additional portion of illumination having at least one additional intensity level to pass through at least one additional aperture. A detector may be configured to receive at least a portion of illumination passing through at least one aperture of the plurality of apertures. A computing system communicatively coupled to the detector may be configured to: receive a first intensity level of a first portion of illumination received by the detector from a first aperture; receive at least one additional intensity level of at least one additional portion of illumination received by the detector from at least one additional aperture; and determine at least one characteristic of the illumination beam emanating from the illumination source by comparing the first intensity level of the first portion of illumination and the at least one additional intensity level of the at least one additional portion of illumination.

Another embodiment of the present disclosure is directed to a method of determining at least one characteristic of an illumination beam emanating from an illumination source, including the steps of: providing a substrate including a plurality of apertures being spatially distributed along a selected scanning path to allow the illumination source to illuminate a selected number of apertures over a selected time interval, the plurality of apertures further being spatially offset from one another in a direction substantially perpendicular to the scanning path allowing a first portion of illumination having a first intensity level to pass through a first aperture and at least one additional portion of illumination having at least one additional intensity level to pass through at least one additional aperture; actuating the substrate to move the plurality of apertures through an illumination beam emanating from the illumination source; receiving at least a portion of illumination passing through at least one aperture of the plurality of apertures utilizing a detector; receiving a first intensity level of a first portion of illumination received by the detector from a first aperture; receiving at least one additional intensity level of at least one additional portion of illumination received by the detector from at least one additional aperture; and determining at least one characteristic of the illumination beam emanating from the illumination source by comparing the first intensity level of the first portion of illumination and the at least one additional intensity level of the at least one additional portion of illumination.

Another embodiment of the present disclosure is directed to a method of calibrating the illumination source, including the steps of: actuating the substrate to move the plurality of apertures through the illumination beam emanating from the illumination source for at least one additional time; receiving at least a portion of illumination passing through at least one aperture of the plurality of apertures utilizing a detector for the at least one additional time; receiving a first intensity level of a first portion of illumination received by the detector from a first aperture for the at least one additional time; receiving at least one additional intensity level of at least one additional portion of illumination received by the detector from at least one additional aperture for the at least one additional time; determining at least one characteristic of the illumination beam emanating from the illumination source for the at least one additional time by comparing the first intensity level of the first portion of illumination and the at least one additional intensity level of the at least one additional portion of illumination for the at least one additional time; determining a rate of change of the at least one characteristic as a function of time by comparing the at least one characteristic of the illumination beam emanating from the illumination source determined for a first time and the at least one characteristic of the illumination beam emanating from the illumination source determined for the at least one additional time; and compensating for an expected change of the at least one characteristic of the illumination beam emanating from the illumination source utilizing the determined rate of change of the at least one characteristic as a function of time.

Another embodiment of the present disclosure is directed to a method of determining at least one characteristic of an illumination beam emanating from an illumination source, including the steps of: providing a substrate including a plurality of apertures being spatially distributed along a selected scanning path to allow the illumination source to illuminate a selected number of apertures over a selected time interval, the plurality of apertures further being spatially offset from one another in a direction substantially perpendicular to the scanning path allowing a first portion of illumination having a first intensity level to pass through a first aperture and at least one additional portion of illumination having at least one additional intensity level to pass through at least one additional aperture; actuating the substrate to move the plurality of apertures through an illumination beam emanating from the illumination source; receiving at least a portion of illumination passing through at least one aperture of the plurality of apertures utilizing a detector; receiving a first plurality of intensity levels of a first plurality of portions of illumination received by the detector from the plurality of apertures at a first level of focus; receiving at least one additional plurality of intensity levels of at least one additional plurality of portions of illumination received by the detector from the plurality of apertures at at least one additional level of focus; and determining at least one characteristic of the illumination beam emanating from the illumination source by comparing the first plurality of intensity levels of the first plurality of portions of illumination received by the detector at the first level of focus and the at least one additional plurality of intensity levels of the at least one additional plurality of portions of illumination received by the detector at the at least one additional level of focus.

Another embodiment of the present disclosure is directed to a method of calibrating the illumination source, including the steps of: actuating the substrate to move the plurality of apertures through the illumination beam emanating from the illumination source for at least one additional time; receiving at least a portion of illumination passing through at least one aperture of the plurality of apertures utilizing a detector for the at least one additional time; receiving a first plurality of intensity levels of a first plurality of portions of illumination received by the detector from the plurality of apertures at a first level of focus for the at least one additional time; receiving at least one additional plurality of intensity levels of at least one additional plurality of portions of illumination received by the detector from the plurality of apertures at at least one additional level of focus for the at least one additional time; determining the at least one characteristic of the illumination beam emanating from the illumination source for the at least one additional time by comparing the first plurality of intensity levels of the first plurality of portions of illumination received by the detector at the first level of focus and the at least one additional plurality of intensity levels of the at least one additional plurality of portions of illumination received by the detector at the at least one additional level of focus for at least one additional time; determining a rate of change of the at least one characteristic as a function of time by comparing the at least one characteristic of the illumination beam emanating from the illumination source determined for a first time and the at least one characteristic of the illumination beam emanating from the illumination source determined for the at least one additional time; and compensating for an expected change of the at least one characteristic of the illumination beam emanating from the illumination source utilizing the determined rate of change of the at least one characteristic as a function of time.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

FIGS. 1A through 5 generally illustrate a system and method for determining at least one characteristic of an illumination beam emanating from an illumination source. Illumination sources often experience negative changes in performance over time resulting from defocusing caused by deterioration or movement of illumination source components and/or optical elements when the illumination source is utilized. An illumination source may be refocused utilizing information associated with one or more beam characteristics such as minimum beam spot size, minimum beam spot location, and/or beam caustic. Accordingly, the present disclosure is directed to a system and associated method for monitoring at least one characteristic of an illumination beam and further directed to a method of calibrating an illumination source by monitoring a change in at least one beam characteristic over time.

Figure 1A:
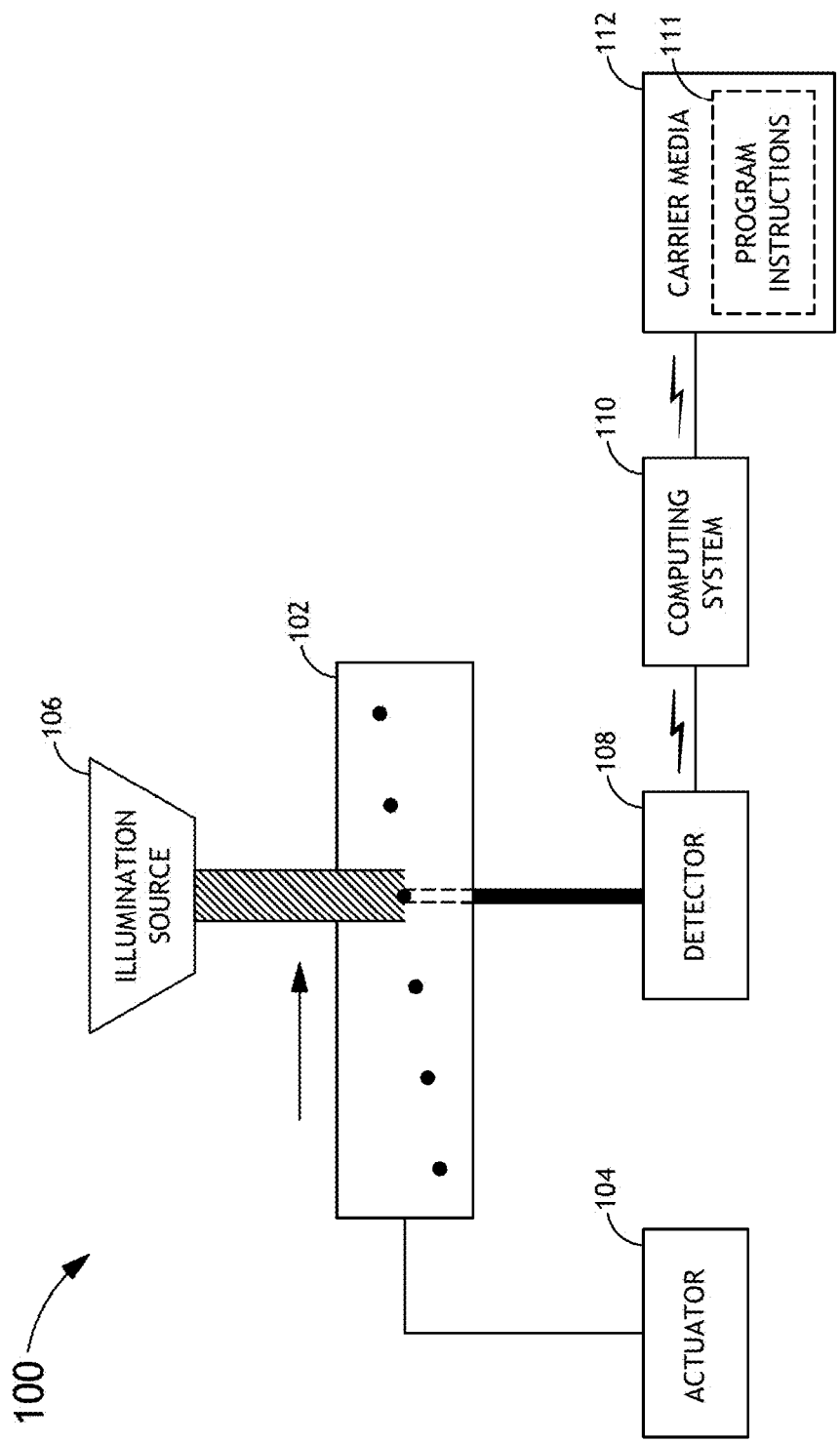
FIG. 1A is a block diagram illustrating a system for determining at least one characteristic of an illumination beam emanating from an illumination source, in accordance with an embodiment of this disclosure.
Figure 1B:
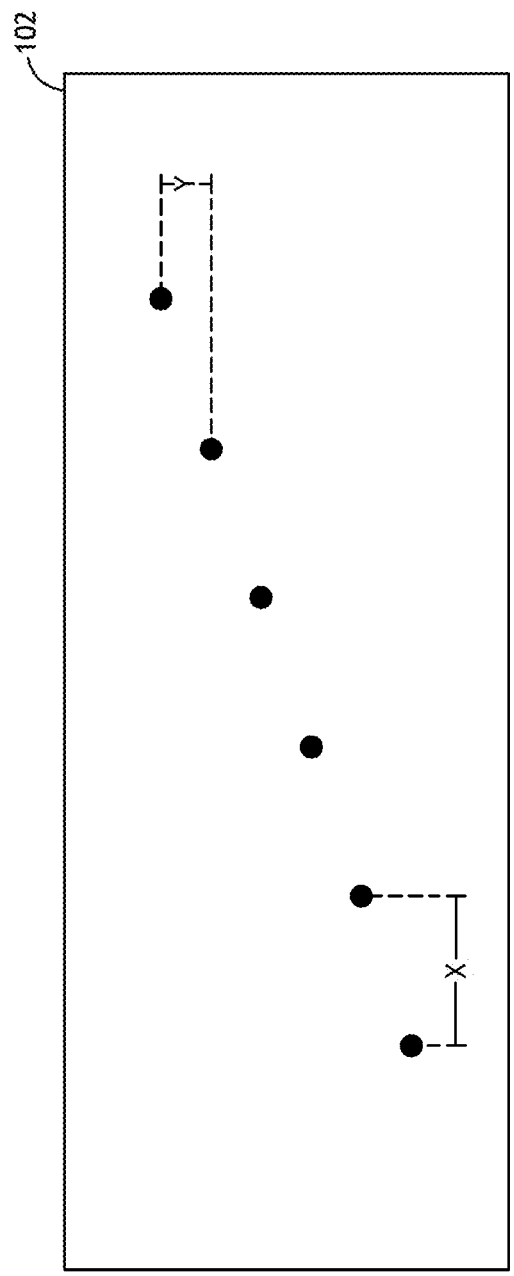
FIG. 1B is a top view illustrating a substrate having a plurality of apertures disposed along a scanning path, in accordance with an embodiment of this disclosure.
Figure 1C:
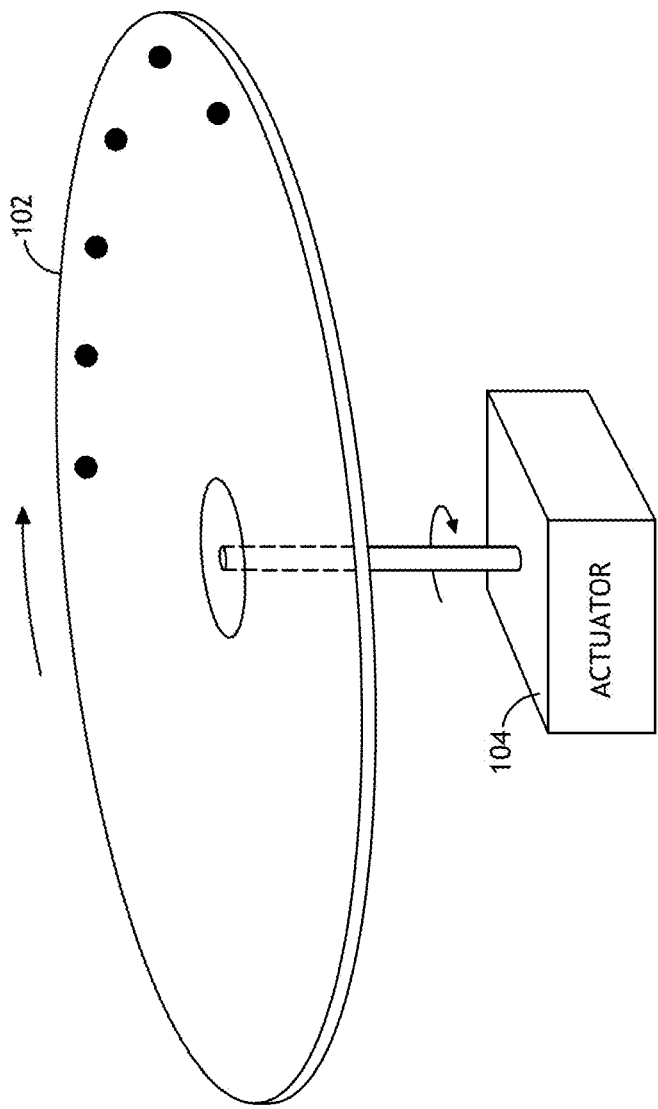
FIG. 1C is a block diagram illustrating a substrate having a plurality of apertures disposed along a curved scanning path and an actuator configured for actuating the substrate in a curved motion, in accordance with an embodiment of this disclosure.

FIGS. 1A through 1C illustrate a system 100 for determining at least one characteristic of an illumination beam emanating from an illumination source 106 in accordance with an embodiment of this disclosure. The system 100 may include a substrate 102 configured to receive a beam of illumination from the illumination source 106. The substrate 102 may include a rigid or semi-rigid opaque material. The substrate 102 may further include a plurality of apertures configured for permitting a portion of illumination received by at least one of the apertures from the illumination source 106 to traverse the substrate 102 through the aperture.

The plurality of apertures of the substrate 102 may be disposed along a scanning path configured to receive illumination from the illumination source 106. The apertures of the substrate 102 may be uniformly distributed along the scanning path. For example, FIG. 1B illustrates the substrate 102 having uniform separation X between apertures of the substrate 102 in a first direction along a linear scanning path. The apertures may be sufficiently spaced apart so that a desired number of apertures are illuminated by the illumination beam emanating from the illumination source 106 at one time. For example, the apertures may be uniformly distributed along the scanning path with sufficient separation X so that the illumination source 106 is configured to illuminate only one aperture at a time.

The apertures of the substrate 102 may be further disposed with an offset from one aperture to the next in a second direction substantially perpendicular to the scanning path. For example, FIG. 1B illustrates the substrate 102 having uniform perpendicular offsets Y between the apertures. The perpendicular offsets Y may allow a first aperture of the substrate 102 to pass a portion of illumination having a different intensity level from another aperture of the substrate depending on a spatial relationship between an illuminated aperture and the illumination beam emanating from the illumination source 106. Accordingly, translating the plurality of apertures of the substrate 102 along the scanning path through the illumination beam may allow detection of different intensity levels for portions of illumination received by apertures having different Y offsets.

An alternative embodiment of the substrate 102 is illustrated in FIG. 1C where the substrate 102 is substantially circular or at least partially curved with the plurality of apertures disposed along a curved scanning path. The apertures may be further disposed with tangential offsets to the curved scanning path. For example, a circular substrate 102 may have apertures disposed uniformly along a circular scanning path with uniform offsets extending from the center of the circular substrate 102. Accordingly, the actuator 104 may be configured to rotate the substrate 102 through the curved scanning path so that the apertures are translated through the illumination beam at a plurality of tangential offsets.

The system 100 may further include an actuator 104 configured to actuate the substrate 102 to move the plurality of apertures along the scanning path through the illumination beam of the illumination source 102. The actuator 104 may include a stage, clamp, or other holder (hereinafter "stage") configured for receiving the substrate 102 and one or more motors configured for translating and/or rotating the stage to actuate the substrate 102. In one embodiment, the actuator 104 may be configured to linearly translate the stage to move the substrate along a linear scanning path through the illumination beam at a desired speed, such as 0.1 to 5 mm/s. The foregoing range is included for illustrative purposes only and is not intended to limit the present disclosure in any way.

The system 100 may further include at least one detector 108 configured to receive at least a portion of illumination passing through an aperture of the plurality of apertures of the substrate 102. In one embodiment, the detector 108 may include a photodiode, photoresistor, camera, or any other photodetector. The detector 108 may be configured to receive a first portion of illumination having a first intensity level through a first aperture. The detector 108 may be further configured to receive at least one additional portion of illumination having at least one additional intensity level through at least one additional aperture.

In a further embodiment, the detector 108 may be configured to receive a first plurality of portions of illumination having a first plurality of intensity levels from the plurality of apertures translated along the scanning path through the illumination beam emanating from the illumination source 106 at a first focus level or Z-height. The detector 108 may be further configured to receive at least one additional plurality of portions of illumination having as at least one additional plurality of intensity levels from the plurality of apertures translated along the scanning path through the illumination beam at at least one additional focus level. The focus level may be adjusted by changing the spatial relationship between the substrate and the illumination source 106 or optical elements defining an illumination beam delivery path of the illumination source 106.

The system 100 may further include at least one computing system 110 communicatively coupled to the detector 108. The computing system 110 may include one or more processors configured to execute program instructions 114 from carrier media 112 to complete one or more steps to determine at least one characteristic of the illumination beam emanating from the illumination source 106. The computing system 110 may be further configured to execute one or more steps to calibrate the illumination source 106. It is further noted that several analysis algorithms are known to the art for conditioning a plurality of data points to extract relevant information, such as interpolation, extrapolation, best fit analysis, Gaussian beam analysis, and the like. The system and methods described herein are intended to encompass all analysis algorithms, techniques, and/or mathematical models known to the art.

In one embodiment, the computing system 110 may be configured to receive a first intensity level corresponding to a first detected portion of illumination from the detector 108. The computing system 110 may be further configured to receive at least one additional intensity level corresponding to at least one additional portion of illumination corresponding to at least one additional detected portion of illumination from the detector 108. The computing system 110 may be further configured to compare the plurality of intensity levels corresponding to portions of illumination detected from the plurality of apertures translated through the illumination beam to determine at least one characteristic, such as minimum beam spot size, minimum beam spot location, and/or beam caustic of the illumination beam emanating from the illumination source 106.

In a further embodiment, the computing system 110 may be configured to receive a first plurality of intensity levels corresponding to a first plurality of detected portions of illumination from the detector 108 at a first focus level. The computing system 110 may be further configured to receive at least one additional plurality of intensity levels corresponding to at least one additional plurality of intensity levels corresponding to at least one additional plurality of detected portions of illumination from the detector 108 at at least one additional focus level. The computing system 110 may be further configured to compare the plurality of intensity levels obtained by translating the plurality of apertures through the illumination beam at a plurality of focus levels to determine at least one characteristic of the illumination beam emanating from the illumination source 106.

In one embodiment, the computing system 110 may be further configured to make multiple determinations of at least one characteristic of the illumination beam at different times to determine a rate of change of the at least one characteristic. The computing system 110 may be further configured to determine compensation necessary to substantially neutralize an expected change of the illumination beam emanating from the illumination source 106 over time. The computing system 110 may be further configured to calibrate a compensator, such as an astigmatism compensator, of the illumination source 106 utilizing the determined compensation necessary for substantially neutralizing the expected rate of beam characteristic change.

FIGS. 2 through 5 illustrate methods of determining at least one characteristic and/or a rate of change of at least one characteristic of an illumination beam emanating from an illumination source 106 in association with system 100. The computing system 110 or a plurality of computing systems may be configured to execute one or more steps of methods 200, 300, 400, and 500 described in further detail herein. However, it is noted that methods 200, 300, 400, and 500 are not limited to embodiments of system 100 described herein. Rather, the present disclosure is intended to encompass any and all systems or apparatuses known to the art for carrying out any of the steps described herein.

Figure 2:
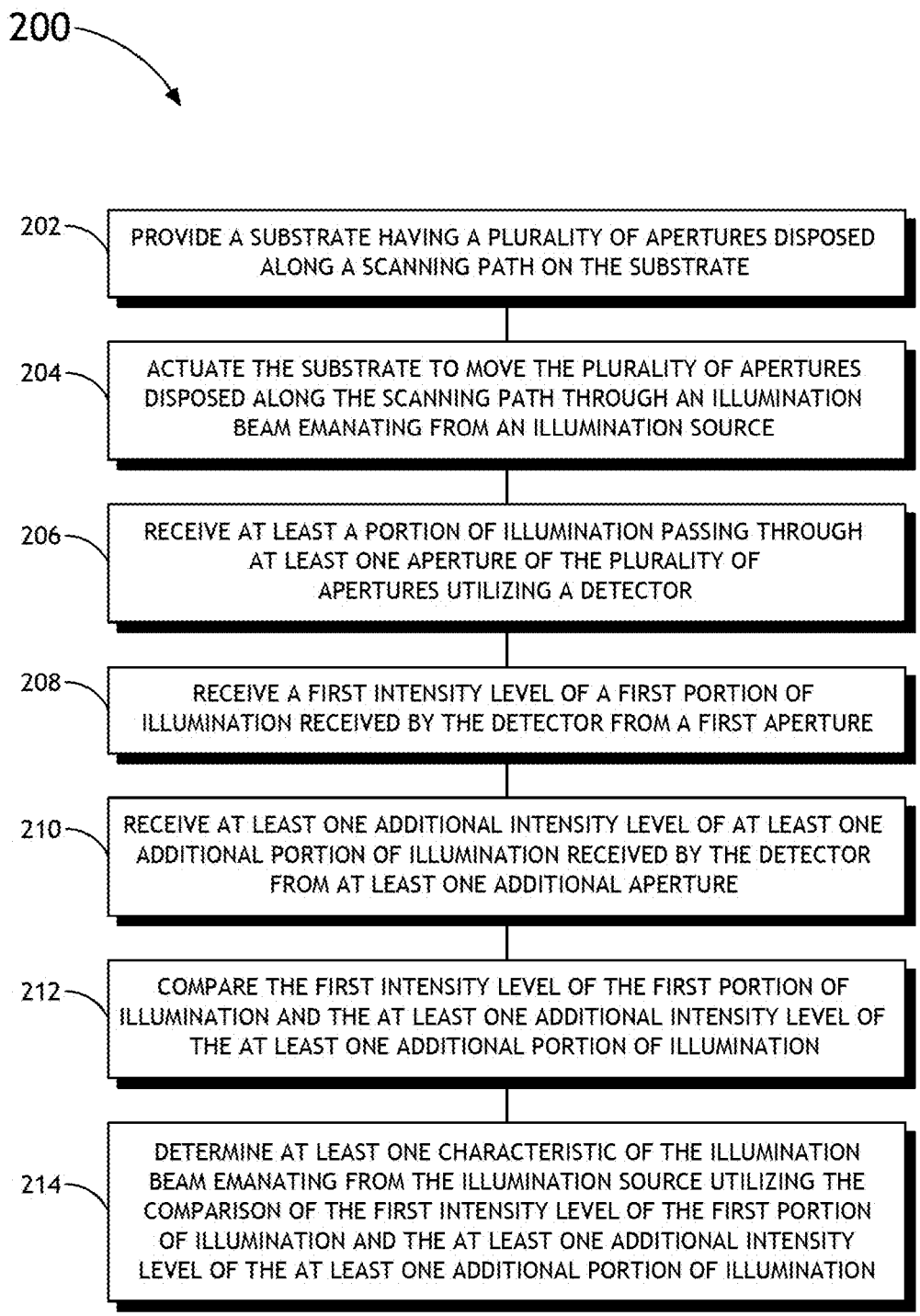
FIG. 2 is a flow diagram illustrating a method of determining at least one characteristic of an illumination beam emanating from an illumination source, in accordance with an embodiment of this disclosure.

FIG. 2 is a flow diagram illustrating method 200 for determining at least one characteristic of an illumination beam emanating from an illumination source 106. In step 202, a substrate 102 having a plurality of apertures distributed along a linear or nonlinear scanning path may be placed between the illumination source 106 and a detector 104 configured to receive at least a portion of illumination directed through an aperture of the substrate 102. In step 204, the substrate 102 may be actuated so that the apertures are translated or rotated through the illumination beam along the scanning path. In step 206, the detector 104 may receive portions of illumination passing through the apertures as they are actuated through the illumination beam. Portions of illumination received by the detector 104 may have different intensity levels due to different perpendicular or tangential offsets of the apertures disposed along the scanning path of the substrate 102.

In steps 208 and 210, a computing system 110 may receive a first intensity level corresponding to a first aperture of the substrate 102 and at least one additional intensity level corresponding to at least one additional aperture of the substrate 102. The data received may be mapped to X and Y (Cartesian) offsets from a reference point, such as a location on the substrate 102, or to offsets defined by any alternative coordinate system (e.g. polar, cylindrical, etc.). In steps 212 and 214, the two or more received intensity levels may be compared to determine at least one characteristic of the illumination beam, such as minimum beam spot size, minimum beam spot location, and/or beam caustic. In one embodiment, the received intensity levels may be compared by analyzing data points collected at different X and Y offsets utilizing a data conditioning algorithm or analysis model known to the art. At least one characteristic of the illumination beam emanating from the illumination source 106 may be determined utilizing a spatial relationship between the offsets associated with apertures of the substrate 102 corresponding to peak intensity levels and the illumination source 106.

Figure 3:
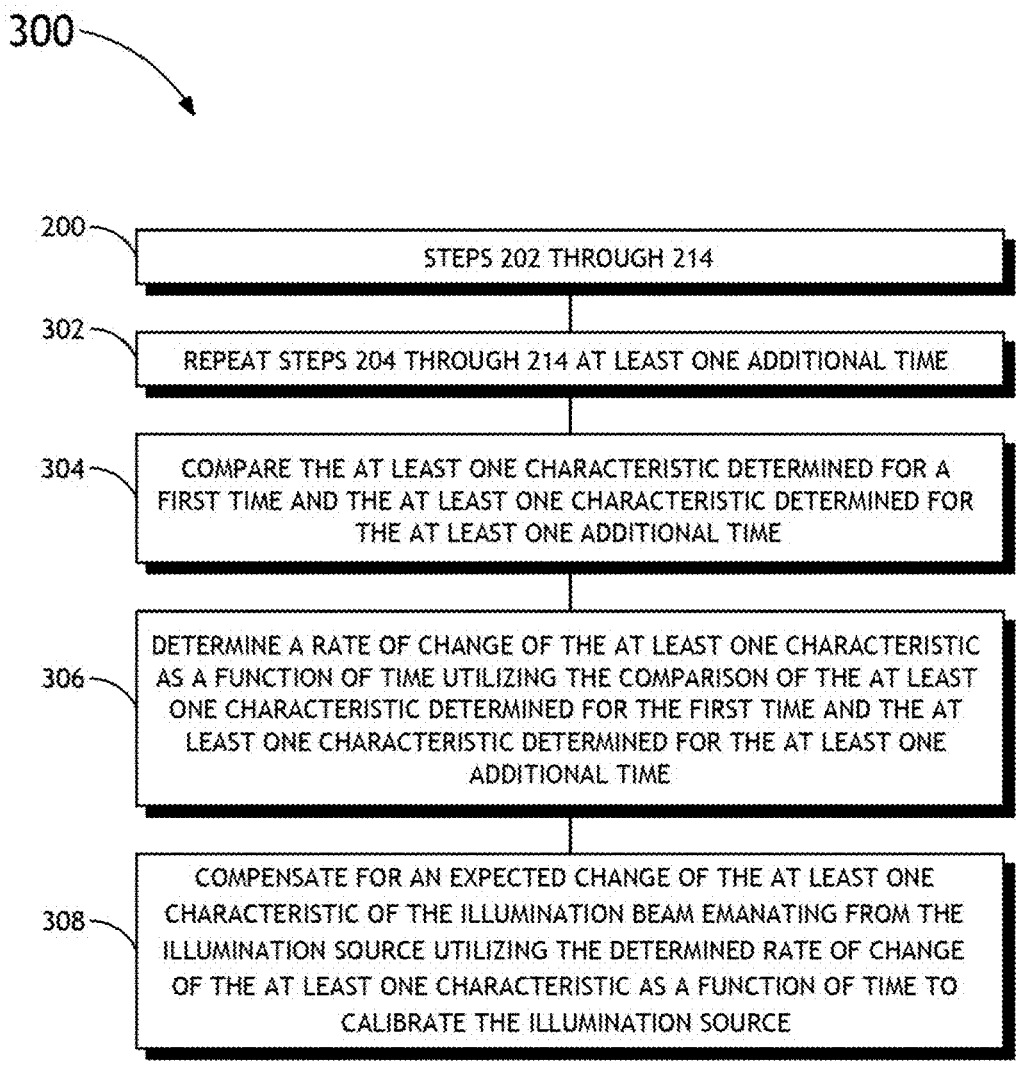
FIG. 3 is a flow diagram illustrating a method of calibrating an illumination source, in accordance with an embodiment of this disclosure.

FIG. 3 illustrates a method 300 of determining a rate of change for at least one characteristic of the illumination beam emanating from the illumination source 106 and utilizing the determined rate of change to calibrate the illumination source 106. The method 300 may include steps 202 through 214 of method 200. The method 300 may further include step 302 of executing one or more of steps 204 through 214 of method 200 at least one additional time so that at least one characteristic of the illumination beam is determined for a first time and for at least one additional time. In steps 304 and 306, values obtained for the at least one characteristic at different times may be compared to determine a rate of change for the at least one characteristic over time. In step 308, the determined rate of change may be utilized to predict an expected change for the at least one characteristic of the illumination beam with time. Accordingly, the illumination source 106 may be calibrated by periodically adjusting components or by manually or automatically configuring a compensator, such as an astigmatism compensator, to neutralize negative performance effects resulting from a change of the at least one characteristic of the illumination beam emanating from the illumination source 106 over time.

Figure 4:
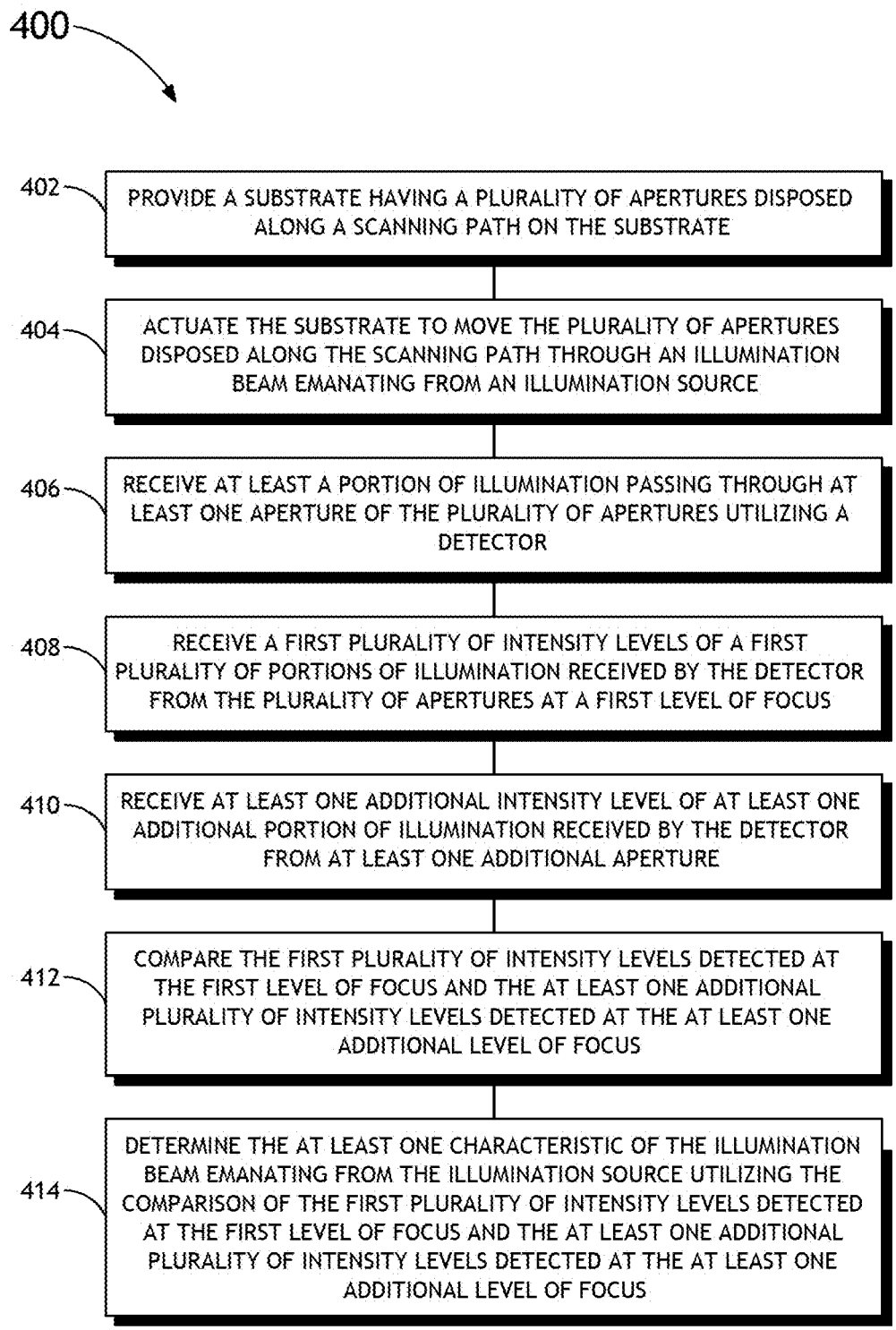
FIG. 4 is a flow diagram illustrating a method of determining at least one characteristic of an illumination beam emanating from an illumination source, in accordance with an embodiment of this disclosure.

FIG. 4 is a flow diagram illustrating method 400 for determining at least one characteristic of an illumination beam emanating from an illumination source 106 by comparing a plurality of intensity levels corresponding to portions of illumination detected through the apertures of the substrate 102 scanned through the illumination beam at a plurality of focus levels. In step 402, the substrate 102 having a plurality of apertures distributed along a linear or nonlinear scanning path may be placed between the illumination source 106 and a detector 104 configured to receive at least a portion of illumination directed through an aperture of the substrate 102. In step 404, the substrate 102 may be actuated so that the apertures are translated or rotated through the illumination beam along the scanning path. The substrate 102 may be actuated through the illumination beam with the illumination source 106 resolved at a first level of focus and actuated through the illumination beam at least one additional time with the illumination source 106 resolved at at least one additional level of focus. The focus levels may be mapped to a Z offset in a Cartesian coordinate system or to a spatial offset defined by any other coordinate system. In step 406, the detector 104 may receive portions of illumination passing through the apertures as they are actuated through the illumination beam at the plurality of focus levels. Portions of illumination received by the detector 104 may have different intensity levels due to different perpendicular or tangential offsets of the apertures disposed along the scanning path of the substrate 102. In addition, the focus level of the illumination source 104 may affect intensity levels of portions of illumination received by the detector 104.

In steps 408 and 410, a computing system 110 may receive a first plurality of intensity levels corresponding to the plurality of apertures of the substrate 102 scanned at a first focus level of the illumination source 106 and at least one additional plurality of intensity levels corresponding to the plurality of apertures scanned at at least one additional focus level. The data received may be mapped to X, Y, and Z (Cartesian) offsets from a reference point, such as a location on the substrate 102, or to offsets defined by any alternative coordinate system (e.g. polar, cylindrical, etc.). In steps 412 and 414, the two or more pluralities of received intensity levels corresponding to different focus levels may be compared to determine at least one characteristic of the illumination beam, such as minimum beam spot size, minimum beam spot location, and/or beam caustic. In one embodiment, the pluralities of received intensity levels may be compared by analyzing data points collected at different X, Y, and Z offsets utilizing a data conditioning algorithm or analysis model known to the art. At least one characteristic of the illumination beam emanating from the illumination source 106 may be determined utilizing a spatial relationship between the offsets associated with apertures of the substrate 102 corresponding to peak intensity levels and the illumination source 106.

Figure 5:
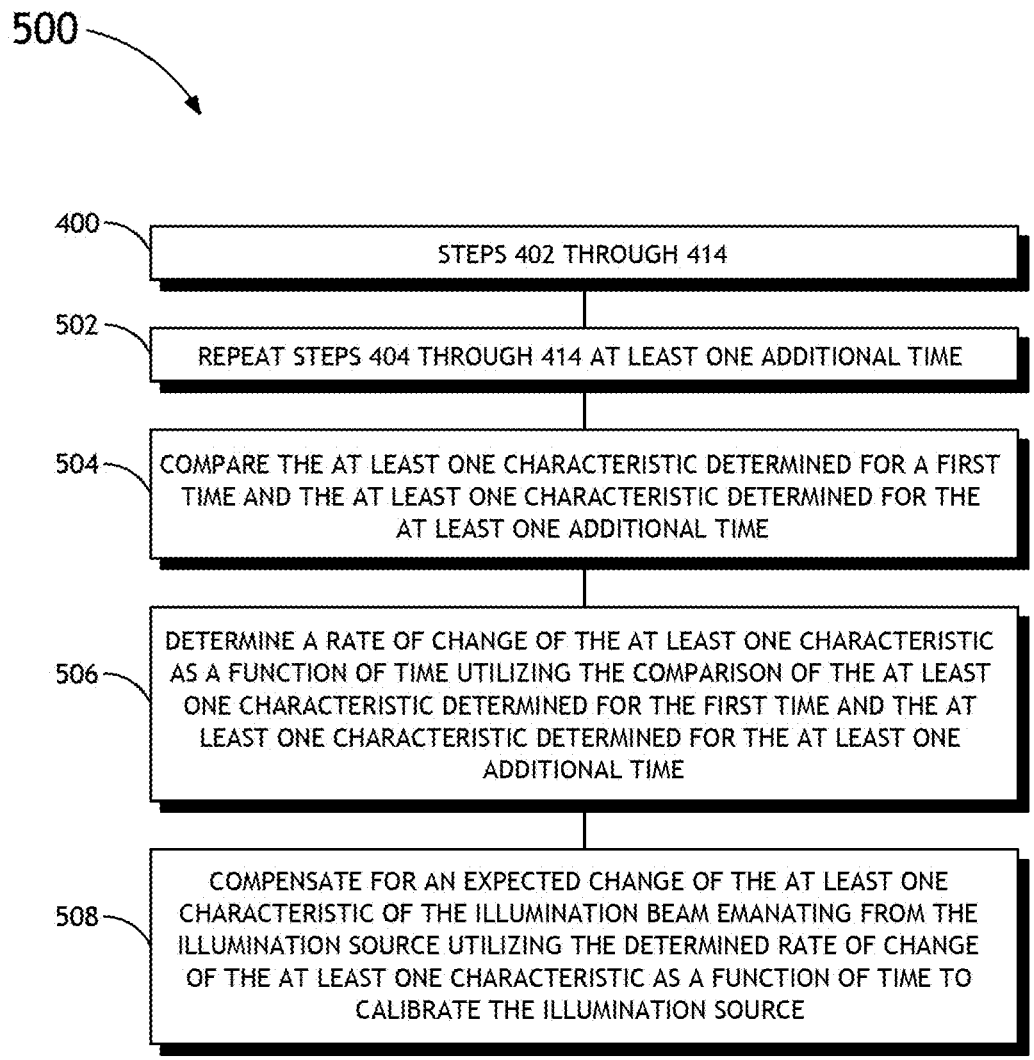
FIG. 5 is a flow diagram illustrating a method of calibrating an illumination source, in accordance with an embodiment of this disclosure.

FIG. 5 illustrates a method 500 of determining a rate of change for at least one characteristic of the illumination beam emanating from the illumination source 106 and utilizing the determined rate of change to calibrate the illumination source 106. The method 500 may include steps 402 through 414 of method 400. The method 500 may further include step 502 of executing one or more of steps 404 through 414 of method 400 at least one additional time so that at least one characteristic of the illumination beam is determined for a first time and for at least one additional time. In steps 504 and 506, values obtained for the at least one characteristic at different times may be compared to determine a rate of change for the at least one characteristic over time. In step 508, the determined rate of change may be utilized to predict an expected change for the at least one characteristic of the illumination beam with time. Accordingly, the illumination source 106 may be calibrated by adjusting components of the illumination source and/or by manually or automatically configuring a compensator, such as an astigmatism compensator, to neutralize negative performance effects resulting from a change of the at least one characteristic of the illumination beam emanating from the illumination source 106 over time.

Any of the systems or methods described above may be further extended to diagnostic testing, maintenance, or calibration of an inspection system or an optical metrology system including the illumination source 106. Several inspection and metrology systems are known to the art and the foregoing systems and methods apply to any such system including an illumination source configured to emanate an illumination beam. For example, several inspection systems are described or referenced by U.S. Pat. No. 7,548,308, U.S. Pat. No. 6,271,916, and U.S. Pat. No. 6,201,601, all incorporation herein by reference.

It is further contemplated that each of the embodiments of the method described above may include any other step(s) of any other method(s) described herein. In addition, each of the embodiments of the method described above may be performed by any of the systems described herein.

It should be recognized that the various steps described throughout the present disclosure may be carried out by a single computing system or, alternatively, a multiple computing system. Moreover, different subsystems of the system may include a computing system suitable for carrying out at least a portion of the steps described above. Therefore, the above description should not be interpreted as a limitation on the present invention but merely an illustration. Further, the one or more computing systems may be configured to perform any other step(s) of any of the method embodiments described herein.

The computing system may include, but is not limited to, a personal computing system, mainframe computing system, workstation, image computer, parallel processor, or any other device known in the art. In general, the term "computing system" may be broadly defined to encompass any device having one or more processors, which execute instructions from a memory medium.

Program instructions implementing methods such as those described herein may be transmitted over or stored on carrier medium. The carrier medium may be a transmission medium such as a wire, cable, or wireless transmission link. The carrier medium may also include a storage medium such as a read-only memory, a random access memory, a magnetic or optical disk, or a magnetic tape.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

What is claimed is:

1. A system for determining at least one characteristic of an illumination beam emanating from an illumination source, comprising:
    a substrate configured to receive illumination from an illumination source, the substrate including a plurality of apertures being spatially distributed along a selected scanning path to allow the illumination source to illuminate a selected number of apertures over a selected time interval, the plurality of apertures further being spatially offset from one another in a direction substantially perpendicular to the scanning path allowing a first portion of illumination having a first intensity level to pass through a first aperture and at least one additional portion of illumination having at least one additional intensity level to pass through at least one additional aperture;
    an actuator configured to actuate the substrate to move the plurality of apertures through an illumination beam emanating from the illumination source;
    a detector configured to receive at least a portion of illumination passing through at least one aperture of the plurality of apertures; and
    a computing system communicatively coupled to the detector, the computing system configured to:
        receive a first intensity level of a first portion of illumination received by the detector from a first aperture;
        receive at least one additional intensity level of at least one additional portion of illumination received by the detector from at least one additional aperture; and
        determine at least one characteristic of the illumination beam emanating from the illumination source by comparing the first intensity level of the first portion of illumination and the at least one additional intensity level of the at least one additional portion of illumination.

2. The system of claim 1, wherein the plurality of apertures are distributed along the substrate with sufficient spacing to allow the illumination source to illuminate only one aperture at a time.

3. The system of claim 1, wherein the plurality of apertures have a substantially uniform distribution along the scanning path.

4. The system of claim 1, wherein the plurality of apertures are substantially uniformly offset from one another in the direction substantially perpendicular to the scanning path.

5. The system of claim 1, wherein the substrate is substantially opaque.

6. The system of claim 1, wherein the detector includes a photodiode.

7. The system of claim 1, wherein the at least one characteristic includes size of a minimum beam spot of the illumination beam emanating from the illumination source.

8. The system of claim 1, wherein the at least one characteristic includes location of a minimum beam spot of the illumination beam emanating from the illumination source.

9. The system of claim 1, wherein the at least one characteristic includes beam caustic of the illumination beam emanating from the illumination source.

10. The system of claim 1, wherein the computing system is further configured to:
    receive a first plurality of intensity levels of a first plurality of portions of illumination received by the detector from the plurality of apertures at a first level of focus;

receive at least one additional plurality of intensity levels of at least one additional plurality of portions of illumination received by the detector from the plurality of apertures at at least one additional level of focus; and determine the at least one characteristic of the illumination beam emanating from the illumination source by comparing the first plurality of intensity levels of the first plurality of portions of illumination received by the detector at the first level of focus and the at least one additional plurality of intensity levels of the at least one additional plurality of portions of illumination received by the detector at the at least one additional level of focus.

11. A method of determining at least one characteristic of an illumination beam emanating from an illumination source, comprising:

providing a substrate including a plurality of apertures being spatially distributed along a selected scanning path to allow the illumination source to illuminate a selected number of apertures over a selected time interval, the plurality of apertures further being spatially offset from one another in a direction substantially perpendicular to the scanning path allowing a first portion of illumination having a first intensity level to pass through a first aperture and at least one additional portion of illumination having at least one additional intensity level to pass through at least one additional aperture;

actuating the substrate to move the plurality of apertures through an illumination beam emanating from the illumination source;

receiving at least a portion of illumination passing through at least one aperture of the plurality of apertures utilizing a detector;

receiving a first intensity level of a first portion of illumination received by the detector from a first aperture;

receiving at least one additional intensity level of at least one additional portion of illumination received by the detector from at least one additional aperture; and determining at least one characteristic of the illumination beam emanating from the illumination source by comparing the first intensity level of the first portion of illumination and the at least one additional intensity level of the at least one additional portion of illumination.

12. The method of claim 11, wherein the at least one characteristic includes size of a minimum beam spot of the illumination beam emanating from the illumination source.

13. The method of claim 11, wherein the at least one characteristic includes location of a minimum beam spot of the illumination beam emanating from the illumination source.

14. The method of claim 11, wherein the at least one characteristic includes beam caustic of the illumination beam emanating from the illumination source.

15. The method of claim 11, wherein the method further includes a method of calibrating the illumination source, comprising the steps of:

actuating the substrate to move the plurality of apertures through the illumination beam emanating from the illumination source for at least one additional time;

receiving at least a portion of illumination passing through at least one aperture of the plurality of apertures utilizing a detector for at least one additional time;

receiving a first intensity level of a first portion of illumination received by the detector from a first aperture for the at least one additional time;

receiving at least one additional intensity level of at least one additional portion of illumination received by the detector from at least one additional aperture for the at least one additional time;

determining at least one characteristic of the illumination beam emanating from the illumination source for the at least one additional time by comparing the first intensity level of the first portion of illumination and the at least one additional intensity level of the at least one additional portion of illumination for the at least one additional time;

determining a rate of change of the at least one characteristic as a function of time by comparing the at least one characteristic of the illumination beam emanating from the illumination source determined for a first time and the at least one characteristic of the illumination beam emanating from the illumination source determined for the at least one additional time; and compensating for an expected change of the at least one characteristic of the illumination beam emanating from the illumination source utilizing the determined rate of change of the at least one characteristic as a function of time.

16. The method of claim 15, wherein an astigmatism compensator is utilized to compensate for the expected change of the at least one characteristic of the illumination beam.

17. A method of determining at least one characteristic of an illumination beam emanating from an illumination source, comprising:

providing a substrate including a plurality of apertures being spatially distributed along a selected scanning path to allow the illumination source to illuminate a selected number of apertures over a selected time interval, the plurality of apertures further being spatially offset from one another in a direction substantially perpendicular to the scanning path allowing a first portion of illumination having a first intensity level to pass through a first aperture and at least one additional portion of illumination having at least one additional intensity level to pass through at least one additional aperture;

actuating the substrate to move the plurality of apertures through an illumination beam emanating from the illumination source;

receiving at least a portion of illumination passing through at least one aperture of the plurality of apertures utilizing a detector;

receiving a first plurality of intensity levels of a first plurality of portions of illumination received by the detector from the plurality of apertures at a first level of focus;

receiving at least one additional plurality of intensity levels of at least one additional plurality of portions of illumination received by the detector from the plurality of apertures at at least one additional level of focus; and determining at least one characteristic of the illumination beam emanating from the illumination source by comparing the first plurality of intensity levels of the first plurality of portions of illumination received by the detector at the first level of focus and the at least one additional plurality of intensity levels of the at least one additional plurality of portions of illumination received by the detector at the at least one additional level of focus.

18. The method of claim 17, wherein the at least one characteristic includes size of a minimum beam spot of the illumination beam emanating from the illumination source.

19. The method of claim 17, wherein the at least one characteristic includes location of a minimum beam spot of the illumination beam emanating from the illumination source.

20. The method of claim 17, wherein the at least one characteristic includes beam caustic of the illumination beam emanating from the illumination source.

21. The method of claim 17, wherein the method further includes a method of calibrating the illumination source, comprising the steps of:

actuating the substrate to move the plurality of apertures through the illumination beam emanating from the illumination source for at least one additional time;

receiving at least a portion of illumination passing through at least one aperture of the plurality of apertures utilizing a detector for the at least one additional time;

receiving a first plurality of intensity levels of a first plurality of portions of illumination received by the detector from the plurality of apertures at a first level of focus for the at least one additional time;

receiving at least one additional plurality of intensity levels of at least one additional plurality of portions of illumination received by the detector from the plurality of apertures at at least one additional level of focus for the at least one additional time;

determining the at least one characteristic of the illumination beam emanating from the illumination source for the at least one additional time by comparing the first plurality of intensity levels of the first plurality of portions of illumination received by the detector at the first level of focus and the at least one additional plurality of intensity levels of the at least one additional plurality of portions of illumination received by the detector at the at least one additional level of focus for at least one additional time;

determining a rate of change of the at least one characteristic as a function of time by comparing the at least one characteristic of the illumination beam emanating from the illumination source determined for a first time and the at least one characteristic of the illumination beam emanating from the illumination source determined for the at least one additional time; and compensating for an expected change of the at least one characteristic of the illumination beam emanating from the illumination source utilizing the determined rate of change of the at least one characteristic as a function of time.

22. The method of claim 21, wherein an astigmatism compensator is utilized to compensate for the expected change of the at least one characteristic of the illumination beam.

* * * * *